United States Patent
Post

(10) Patent No.: US 8,350,399 B2
(45) Date of Patent: Jan. 8, 2013

(54) MICROTURBINE SYSTEM, AND METHOD

(75) Inventor: Jan Post, Utrecht (NL)

(73) Assignee: Bepart B.V., Utrecht (NL)

( * ) Notice: Subject to any disclaimer, the term of this patent is extended or adjusted under 35 U.S.C. 154(b) by 348 days.

(21) Appl. No.: 12/681,098

(22) PCT Filed: Oct. 2, 2008

(86) PCT No.: PCT/NL2008/050631
§ 371 (c)(1),
(2), (4) Date: Jul. 29, 2010

(87) PCT Pub. No.: WO2009/045103
PCT Pub. Date: Apr. 9, 2009

(65) Prior Publication Data
US 2010/0295308 A1    Nov. 25, 2010

(30) Foreign Application Priority Data
Oct. 2, 2007    (NL) .................................... 1034458

(51) Int. Cl.
*F01D 1/26* (2006.01)
(52) U.S. Cl. ......................................................... 290/52
(58) Field of Classification Search .................... 290/52
See application file for complete search history.

(56) References Cited

U.S. PATENT DOCUMENTS 6,866,478 B2 *  3/2005  Fabian et al. ............... 415/198.1
6,900,553 B2 *  5/2005  Gozdawa ........................ 290/52

FOREIGN PATENT DOCUMENTS

| BE | 871024 A | * | 4/1979 |
| CH | 154 279 A | | 4/1932 |
| DE | 174 227 C | | 4/1904 |
| DE | 118919 | * | 3/1976 |
| GB | 105 031 A | | 3/1917 |
| GB | 2408072 A | * | 5/2005 |
| GB | 2 417 294 A | | 2/2006 |
| JP | 55075502 A | * | 6/1980 |
| JP | 04 237801 A | | 8/1992 |
| WO | WO 2006/135260 | | 12/2006 |

OTHER PUBLICATIONS

International Search Report issued in PCT/NL2008/050631 dated Jan. 28, 2009.

* cited by examiner

*Primary Examiner* — Joseph Waks
(74) *Attorney, Agent, or Firm* — Knobbe, Martens, Olson & Bear, LLP

(57) ABSTRACT

A microturbine system provided with a first and a second blade wheel, at least one nozzle for spouting a pressure medium onto the first blade wheel for driving this wheel, wherein the first blade wheel is configured for transferring pressure medium received from the nozzle to the second blade wheel for driving the second blade wheel, the arrangement being such that the first and second blade wheel are rotatable in opposite directions under the influence of the pressure medium, and a first and second electricity generator, respectively, coupled to the first and second blade wheel, respectively. Also included is the method for generating electricity using the microturbine system.

23 Claims, 4 Drawing Sheets

MICROTURBINE SYSTEM, AND METHOD

This application is a U.S. National Phase of International Application No. PCT/NL2008/050631, filed Oct. 2, 2008, designating the U.S. and published in English as WO 2009/045103 on Apr. 9, 2009, which claims the benefit of Dutch Patent Application No. NL 1034458 filed Oct. 2, 2007.

The invention relates to a microturbine system.

Various systems for generating electricity are known. Power stations for instance utilize relatively sizeable, complex, expensive steam turbines and electricity generators, designed for generating high powers (>1 MW). Such steam turbines are known in many variants and, in view of the size and cost price, are not suitable for small scale use.

The design of known, sizeable power plant turbine systems is not suitable to be downsized for the purpose of local use. Turbine systems are typically provided with a large number of slots (for instance along rotating turbine parts and at bearings). Such slots can hardly be downsized, if at all, within desired workable machine tolerances, so that reduction of remaining system parts would lead to inacceptable leakage losses.

British patent application GB 2417294 proposes a completely novel steam turbine design for the purpose of domestic or small scale commercial use. This known system is provided with a boiler rotating under the influence of steam supplied to turbine channels. GB '294 states that the turbine can be efficient only with high rotational speeds. Rotation can be transmitted to various applications via a reduction gear. The steam turbine can drive a 230V generator.

In addition, from practice, the relatively expensive WhisperGen™ system is known, comprising a cogeneration system (heat and electricity) based on a 4 cylinder Stirling motor (see WO2006135260). Another system known from practice (the Lion® of Otag) is provided with a free piston.

CH154279 describes a system provided with two wheels rotating in opposite directions which are couplable to respective electric generators. GB 105031 describes a similar system, wherein the wheels are coupled to a circulating pump and an air pump. These systems are relatively sizeable and rather inefficient.

The present invention contemplates an improved microturbine system. The invention contemplates in particular a relatively small turbine system which can generate electricity relatively efficiently.

According to the invention, the system is characterized to this end in that it is provided with:
- a first and a second blade wheel;
- at least one nozzle for spouting a pressure medium onto the first blade wheel, for driving this wheel, wherein the first blade wheel is configured for transferring pressure medium received from the nozzle onto the second blade wheel for driving the second blade wheel, the arrangement being such that the first and second blade wheel are rotatable in opposite directions under the influence of the pressure medium; and
- a first and second electricity generator, respectively, which are coupled to the first and second blade wheel, respectively.

The microturbine system according to the invention can be designed having relatively small dimensions so that the system is particularly suitable for local use (for instance in households, for small scale commercial use, in a transport means, vessel, vehicle, aircraft or the like). The system can furthermore be built up from relatively few parts, comprise a durable and relatively inexpensive structure and deliver electricity with a relatively high yield (preferably more than 60%).

Possible uses of the present microturbine system comprise, for instance, a micro CHP (combined heat and power) installation, central heating systems, or a semi hybrid drive for ships. The microturbine system can be utilized as second step in a combined cycle STEG (steam and gas plant) unit, wherein a first step comprises, for instance, a gas turbine or fuel cell.

Preferably, the medium mentioned is steam, however, other high pressure mediums (for instance high pressure gas or a high pressure gas mixture) can also be utilized.

According to a preferred embodiment of the invention, the system is provided with synchronization means which are designed for synchronizing rotation of the blade wheels. It is preferred that rotational speed is synchronized via (utilizing) the electricity generators. In a simple elaboration, for the purpose of rotation synchronization, electric outputs of the generators can be indirectly or directly electrically coupled to each other (via a suitable electric connection). Alternatively, during use, the blade wheels and generators can run asynchronously with respect to each other.

According to a further elaboration, each electricity generator is provided with a respective rotor which is non-rotatably coupled to a drive shaft, which drive shaft is non-rotatably coupled to a respective blade wheel. In this manner, each blade wheel can be directly non-rotatably coupled to the associated generator, so that use of inefficient reduction gears is avoided.

According to a particularly advantageous elaboration, the system is provided with a first chamber sealed off gas-tightly from a surrounding, wherein said blade wheels are disposed. During use, the pressure in this chamber can for instance be subatmospheric (for instance a pressure of approximately 0.1 bar or less). Preferably, the system is provided with second chambers, sealed off gas-tightly from the surrounding, in which at least rotors of the electricity generators mentioned are disposed. A particularly durable, efficient and compact system is achieved when the system is provided (at least, is configured) with means for transferring a (preferably relatively low) pressure prevailing during use in the first chamber to each of the second chambers. In these second chambers for instance, also during use, a subatmospheric pressure (for instance a pressure of approximately 0.1 bar or less) can prevail.

According to a further elaboration, the first blade wheel is provided with first pressure medium receiving channels, which are configured for spouting, during use, a pressure medium received from the nozzle in a first driving direction, in a second driving direction onto the second blade wheel, wherein both the first and second driving direction have an axial speed component, wherein a tangential speed component of the second driving direction is opposite to a tangential speed component of the first driving direction.

The invention further provides a method for generating electricity, preferably utilizing a system according to the invention, the method comprising:
- generating a pressure medium;
- rotating a first blade wheel in a first rotational direction utilizing the pressure medium;
- rotating a second blade wheel in a second rotational direction opposite to the first rotational direction utilizing pressure medium coming from (dispensed by) the first blade wheel;
- driving, under the influence of the first and second rotating blade wheel, a first and second electricity generator, respectively.

In this manner, the above-mentioned advantages can be obtained. Preferably, the blade wheels and rotors of the generators are disposed in one or more spaces sealed off gas-tightly from a surrounding, which spaces are held at a reduced pressure (for instance approximately 0.1 bar or less) with respect to an ambient pressure.

Preferably, the blade wheels rotating in opposite directions have the same rotational speed. Alternatively, the wheels are synchronized, whereby the second wheel has a lower rotational speed than the first wheel.

Further advantageous embodiments of the invention are described in the subclaims. Presently, the invention will be clarified on the basis of an exemplary embodiment and the drawing. In the drawing:

In this application, identical or corresponding features are indicated with identical or corresponding reference numerals. In FIGS. 1, 2, three orthogonal directions are indicated with arrows X, Y, and Z, respectively.

Figure 1:
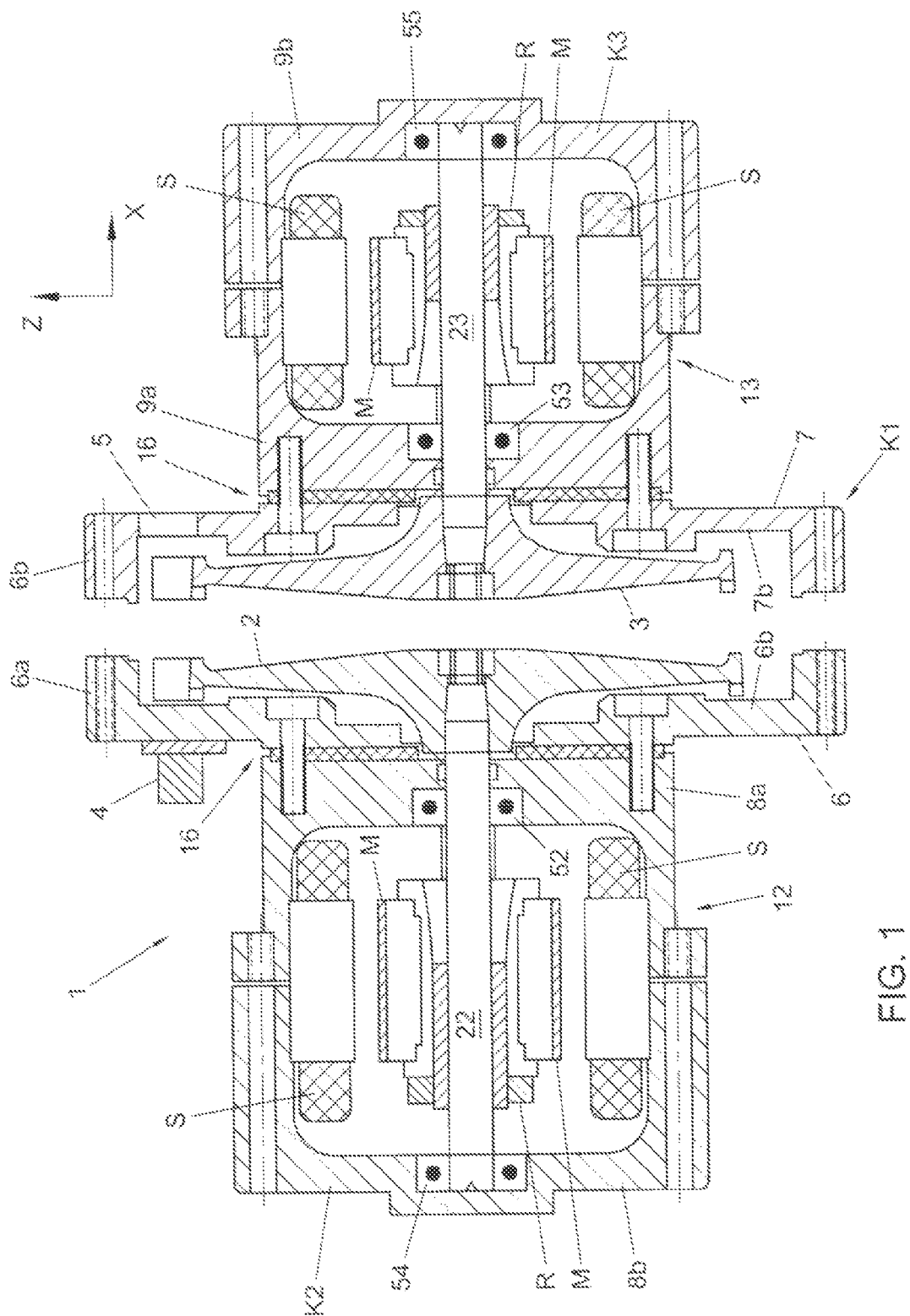
FIG. 1 shows a longitudinal cross section of a partly exploded exemplary embodiment of the invention.
Figure 2:
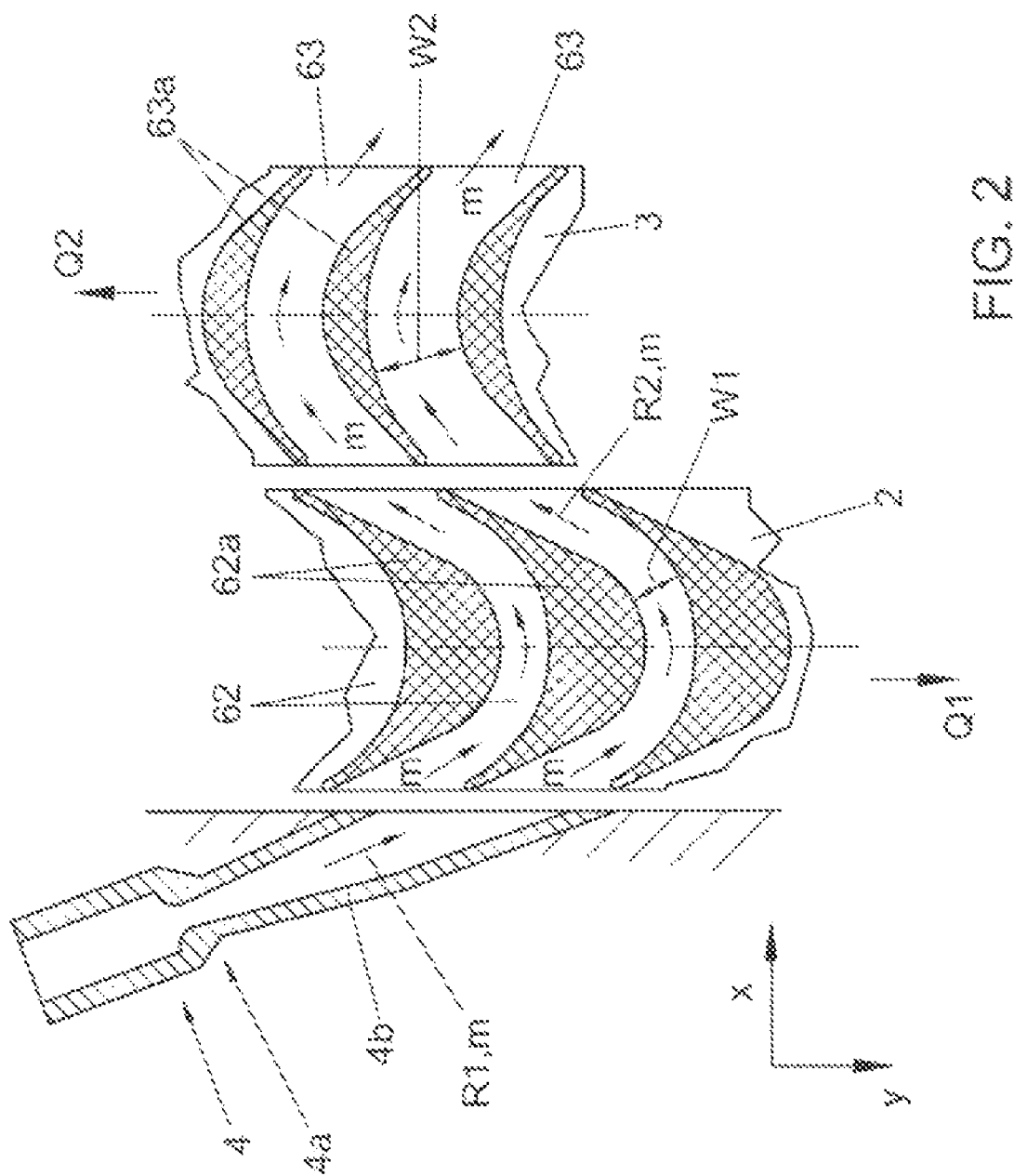
FIG. 2 shows a top plan view of a detail of the exemplary embodiment of FIG. 1.
Figure 3:
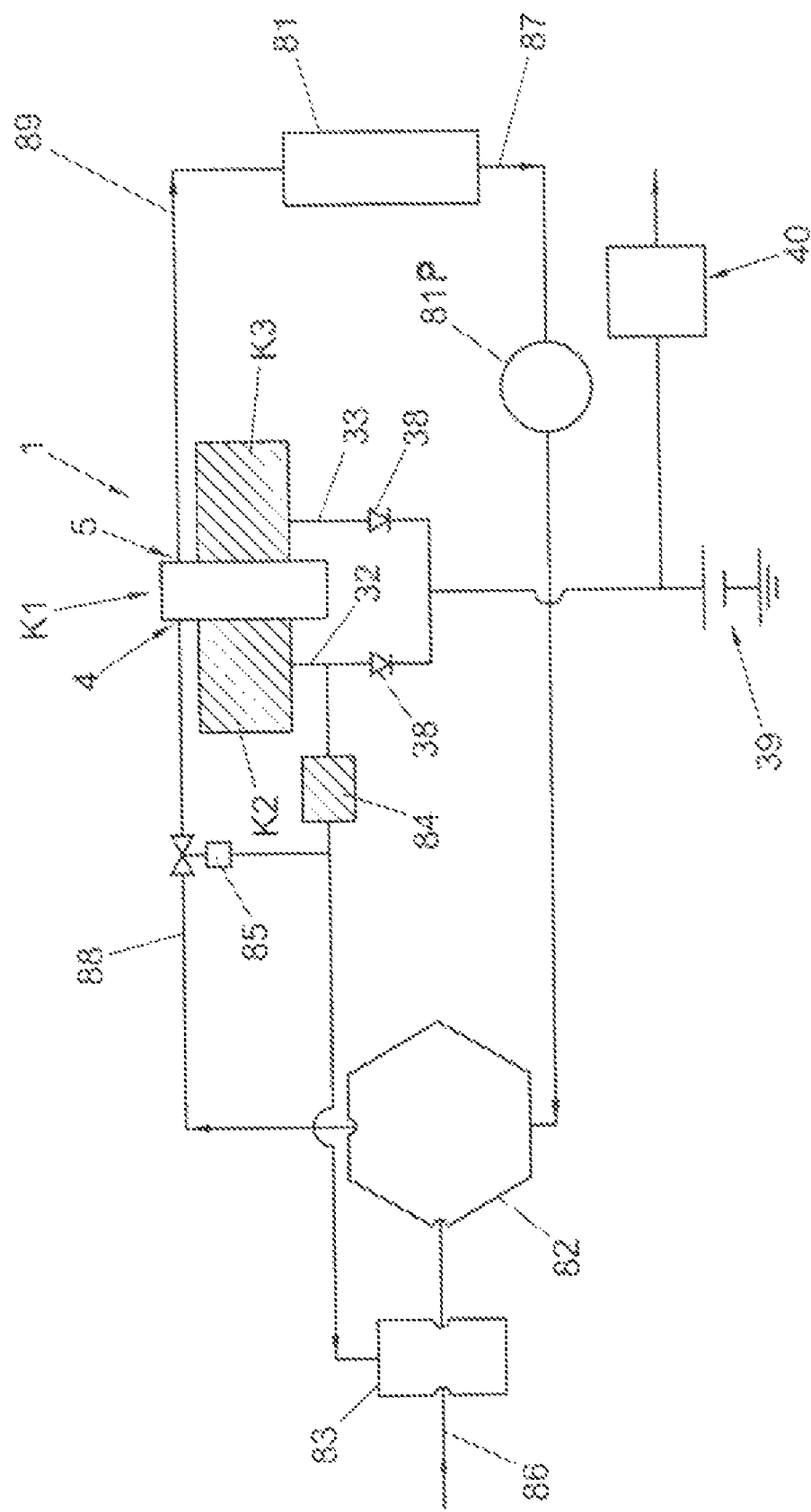
FIG. 3 shows a diagram of an exemplary embodiment.

FIGS. 1-3 schematically show an exemplary embodiment of a microturbine system 1 (also called Turbogenerator) The system is provided with a first and a second rotatable blade wheel 2, 3 and at least one nozzle 4 (in particular of a jet) for spouting a pressure medium brought to a superatmospheric (for instance a vapour, steam or other medium) onto the first blade wheel 2, for driving this wheel 2. The wheels 2, 3 are in particular axially in line with respect to each other. The first blade wheel 2 is configured for transferring the pressure medium received from the nozzle 4 to the second blade wheel 3, for driving the second blade wheel 3. The arrangement is such that the first and second blade wheel 2, 3 are rotatable in opposite directions under the influence of the pressure medium. A first rotational direction of the first wheel 2 is indicated with arrow Q1 in FIG. 2, and the opposite rotational direction with arrow Q2. The system 1 is further provided with a first and second electricity generator 12, 13, respectively, which are coupled to the first and second blade wheel 2, 3, respectively.

The electricity generators 12, 13 can be designed in different manners, which will be clear to the skilled person. In the exemplary embodiment, each of these generators 12, 13 is provided with fixed magnets M and coils S which are movable with respect to each other for generating current in the coils S (by means of induction). In particular, the generators 12, 13 are provided with rotors R comprising the permanent magnets M; the rotors R are for instance non-rotatably connected to respective rotatable drive shafts 22, 23. The drive shafts 22, 23 are axially in line with respect to each other (at least, extend along the same central axis).

In particular, the rotor R of the first electricity generator 12 is non-rotatably coupled to a first drive shaft 22, which first drive shaft 22 is non-rotatably coupled to the first blade wheel 2. The rotor R of the second electricity generator 13 is non-rotatably to a second drive shaft 23, which second drive shaft 23 is non-rotatably coupled to the second blade wheel 3. In this manner, the blade wheels 2, 3 are directly, non-rotatably, connected to respective generators 12, 13 (via the shafts 22, 23) so that, during use, the rotors R of the generators 12, 13 rotate at the same speeds as the associated wheels 2, 3.

The coils S form, for instance, part of stator parts of the generators 12, 13. The coils S are coupled to electricity outputs 32, 33 (see FIG. 3) for discharging the current (in this case, alternating current) generated by the respective generators 12, 13. Each of the electricity outputs 32, 33 can for instance comprise a multiphase output (for instance a 3-phase output) depending on the configuration of the generators. According to a non-limitative example, each generator 12, 13 can for instance be provided with 8-pole rotors. Each generator 12, 13 can for instance be designed for supplying approximately 2,000 Hz of alternating current at 30,000 rpm. In particular, the first and second generator 12, 13 are designed for generating the same current, when the rotors R of the generators 12, 13 rotate at the same speed. Alternatively, the generators can mutually generate different currents when the rotors R of the generators 12, 13 rotate at the same speed (see below).

Additionally, it is advantageous if the generators (12, 13 are designed for generating different powers: the first generator is preferably designed for delivering a higher power at a particular speed than a power delivered by the second generator 13, at the same speed. A ratio of powers to be produced by the generators 12, 13 is preferably approximately equal to powers to be produced by the blade wheels 2, 3, respectively during use (for instance, during use, the upstream first blade wheel 2 will typically deliver a higher power to the respective drive shaft 22 than the downstream second wheel 3 delivers to the respective shaft 23, in particular as a result of loss of kinetic energy of the pressure medium for the purpose of driving the first blade wheel 2).

Preferably, the blade wheels 2, 3 and rotor parts of the generators are disposed in one or more space(s) sealed off gas-tightly from a surrounding. During use, these one or more spaces can be held at a reduced pressure with respect to an ambient pressure (prevailing outside the system 1). This reduced pressure can for instance be less than 1 atmosphere, and can preferably comprise 0.1 bar or a lower pressure.

The exemplary embodiment is provided with a first chamber K1, sealed off gas-tightly from a surrounding, in which the rotatable blade wheels 2, 3 are disposed. The chamber K1 is preferably cylindrical (for instance having a cylindrical wall). In FIG. 1, this chamber K1 is represented in taken apart (opened) position, wherein casing parts 6, 7 which surround the chamber have been moved apart slightly in axial direction X. With the first chamber K1 in closed position, the (preferably annular) flanges 6a, 7a facing each other of the casing parts 6, 7 are coupled to each other substantially gas-tightly (and for instance detachably connected to each other, for instance by bolt means or the like, not represented). The flanges 6a, 7a reach in axial direction from respective longitudinal walls 6b, 7b of the chamber K1. Each chamber longitudinal wall 6b, 7b is provided with a shaft passage 6c, 7c for passing therethrough the drive shafts 22, 23 and/or central blade wheel parts (see FIG. 1).

Preferably, the system is provided with second chambers K2, K3 also sealed off gas-tightly from the surrounding, preferably cylindrical chambers, in which at least the rotor parts of the electricity generators 12, 13 are disposed. In the exemplary embodiment, also, the stator parts provided with coils S are disposed in this chamber. Each second chamber K2, K3 can be of removable design, with detachably inter-coupled casing parts, for gaining access to generator parts present in this chamber. As shown in FIG. 1, the second chambers K2 are for instance provided with first sidewalls 8a, 9a which are provided on sides of the longitudinal walls 6b, 7b remote from the first chamber (via, for instance, detachable bolt means). Each sidewall 8a, 9a is provided with a passage for passing therethrough a drive shaft 22, 23. In the exemplary embodiment, each side wall 8a, 9a is provided with a bearing 52, 53 for bearing mounting the drive shaft 22, 23 passed through this sidewall. Opposite, in particular closed, sidewalls 8b, 9b of the second chambers K2, K3 are also provided with bearings 54 and 55, respectively, for holding the ends of the drive shafts 22, 23. As follows from the above, the three chambers K1, K2, K3 together form, preferably, a casing which encloses the generator parts M, S, drive shafts 22, 23 and turbine blade wheels 2, 3 in a gastight manner.

Preferably, the system is provided with means for transferring a pressure, prevailing during use in the first chamber K1, to each of the second chambers K2, K3 (at least for equalizing the pressure between the chambers K1, K2, K3). Such pressure equalizing means can be designed in different manners, and comprise, for instance, one or more passages or channels which extend through the sidewalls 6, 7, 8a, 9a, designed for allowing flow of gas from each second chamber to the first chamber. Preferably, the pressure equalizing means are designed to prevent or substantially block feed-through of a pressure medium (for instance steam) from the first chamber K1 to each second chamber K2, K3.

It will be clear to the skilled person that the pressure equalizing means can be designed in different manners. According to an advantageous elaboration, the above mentioned bearings 52, 53 are the pressure equalizing means. Each of the bearings 52, 53 can for instance be designed for allowing a certain flow of gas from each second chamber K2, K3 to the first chamber K1. The bearings 52, 53 can be designed for bringing and holding the second chamber K2, K3 at a particular (mentioned) reduced pressure by discharging gas from those chambers K2, K3 to the first chamber K1, via the bearings 52, 53. In addition (as mentioned) the bearings 52, 53 are then preferably designed to prevent flow-through of said pressure medium (through the bearings 52, 53).

In a further elaboration, between a bearing 52, 53 and a blade wheel, a sealing ring (not shown) may be arranged which sealing ring is designed for allowing only the passage of gas from the respective second chamber K2, K3 to the first chamber K1. Here, a respective drive shaft 22, 23 can project through this sealing ring.

The bearings 52, 53, 54 can each be designed in different manners, and comprise, for instance, ball bearings or a different type of bearing.

In the exemplary embodiment, the first (central) chamber K1 and second chambers K2, K3 are detachably connected to each other. Between the chambers K1, K2, K3, for instance insulating and/or damping means 16 are provided, for instance plastic plates, Teflon, synthetic plates and/or other material. The insulating and/or damping means 16 can for instance serve for inhibiting heat transfer between the walls of, on the one side, the first chamber and, on the other side, walls of the second chambers K2, K3. The insulation is in particular advantageous if, during use, a temperature of the first chamber is higher than a temperature of a generator chamber K2, K3.

The chamber walls of the three chambers K1, K2, K3 are preferably manufactured from aluminum, but can also comprise other material (for instance steel). Further, the second chambers K2, K3 may have been manufactured in one piece with the first chamber K1, or be undetachable from each other in another manner. Sidewalls 8a, 9a of the second chambers K2, K3 can for instance be integrated with longitudinal walls 6b, 7b of the central chamber K1.

In the exemplary embodiment, the first longitudinal wall 6b of the (steam turbine) chamber K1 is provided with the one or more nozzles 4 disposed at fixed positions (for instance at or near an upper side of the chamber K1). Preferably, each nozzle is of the Laval type (known per se) (see FIG. 3). Each nozzle 4 is designed for spouting the pressure medium at a supersonic speed in a particular direction R1 into the first chamber K1 (see FIG. 2) for driving the first blade wheel 2. The Laval nozzle 4 is provided in particular with a reduced portion 4a, with a part 4b somewhat diverging therefrom in downstream direction. Each nozzle is preferably directed towards a circumferential part of the first blade wheel 2, which circumferential part comprises blade channels 62 (see below).

According to a further elaboration, each nozzle 4 is manufactured from thermally insulating material, for instance heat resistant plastic, for instance polytetrafluoroethylene PTFE (also known as Teflon). In this manner heat transfer via the nozzle 4 to the casing can be prevented well, so that heat losses can be reduced. Further, a plastic nozzle 4 can be produced at relative low costs in a particularly accurate manner. Further, an inner side of a plastic (preferably PTFE) nozzle 4 can be designed to be relatively smooth, to prevent frictional losses between nozzle 4 and pressure medium.

The second longitudinal wall 7b of the first chamber K1 is provided with a condenser outlet 5, for discharging the pressure medium from the chamber K1 and supplying it to a low pressure condenser 81. The condenser outlet 5 is located for instance at a position approximately opposite the one or more nozzles 4 mentioned. As schematically shown in FIG. 3, after assembly, a pressure medium discharge line 89 can be connected to the outlet 5 for bringing this outlet in fluid communication with an inlet of the condenser 81.

The condenser 81 can be designed in different manners, and preferably comprises a heat exchanger, designed for withdrawing heat from the pressure medium for the purpose of condensing this medium. The condenser 81 can for instance be designed for transferring the heat, coming from the pressure medium, to ambient air and/or a heat receiving medium. Such residual heat can for instance be used in a space heating system (for instance central heating system) and/or for other uses.

A condensate discharge line 87, provided with a condensate pump 81p, can be present for condensed pressure medium from the condenser 81 to a heating device 82, for instance a boiler or the like. The heating device 82 is designed for bringing condensed pressure medium to superatmospheric pressure by heating the pressure medium. When utilizing steam as pressure medium, the heating device 82 can generate steam, from steam (i.e. water) condensed by the condenser 81.

The heating device 82 can bring the pressure medium to a pressure of, for instance, more than 2 bar, preferably a pressure of approximately 5 bar or more. A temperature of the pressure medium brought by the heating device at superatmospheric pressure is for instance higher than 100° C., preferably higher than 150° C. and more preferably approximately 200° C. or more. The pressure medium dispensed by the heater 82, to be supplied to the nozzle(s) can comprise, for instance, superheated steam with a temperature in the range of 200-250° C.

The nozzle or nozzles 4 of the system 1 can be connected, via a suitable supply line 88, to an outlet of the heating device 82, for receiving the pressure medium brought to pressure. Preferably, the pressure medium supply line 88 is provided with regulating means, for instance a regulating valve 85 for regulating, adjusting and/or sealing off the feed-through of the superatmospheric pressure medium. The regulating means 85 are for instance controllable by an optional control device 84 of the system 1.

FIG. 2 shows a detail of the system 1, in top plan view. The flow of pressure medium is indicated with arrows R1, R2, m in FIG. 2. Preferably, the first blade wheel 2 is provided with (arcuate) first pressure medium receiving channels 62 (see FIG. 2), which are configured for, during use, spouting pressure medium received from the nozzle 4 in a first drive direction R1, in a second drive direction R2 onto the second blade wheel 3. As shown in FIG. 2, both the first and second drive direction have an axial speed component (parallel to the rotational axis of the blade wheel 2, in a direction indicated with arrow X). A tangential speed component of the second drive direction (being tangential with respect to the circumferential direction of the blade wheel 2) is opposite to a tangential speed component of the first drive direction. In FIG. 2, the tangential components are parallel to the direction indicated with Y. The first drive direction R1 can for instance include an angle with the axial direction X in the range of approximately 60-80°, for instance approximately 70°, or another angle.

The blade wheels 2, 3 are in particular each provided along the circumference with respective blades (at least blade-forming walls or partitions) 62a, 63a, surrounding the channels 62, 63 in tangential directions (see FIG. 2).

The blade channels 62, 63 each preferably have constant channels widths W1, W2 in the lateral channel directions, viewed along pressure medium through flow directions (these widths are indicated with arrows W1, W2 in FIG. 2). To this end, opposite sides of blade parts 62a and 63a, respectively, which surround a channel 2 or 3, respectively, are partly concentric. In the exemplary embodiment, the channel width W2 of each of the channels 63 of the second wheel 3 is somewhat greater (for instance at least 10% greater, in particular approximately 50%-200% greater) than the channel width W1 of the channels 62 of the first wheel 2.

The blades 62, 63a are formed such (in the present system 1) that the channels 62, 63 extending therebetween are U-shaped, viewed in radial direction. A curvature of the channels 62 of the first wheel 2 can for instance be somewhat greater than the curvature of the channels 63 of the second wheel 3 (viewed in radial blade wheel direction, see FIG. 2). As further shown in FIG. 2, the pressure medium spouted at supersonic speed from each nozzle 4 can follow substantially S-shaped courses, via the channels of the two wheels 2, 3.

The wheels 2, 3 can be manufactured from different materials. It has appeared that use of plastic wheels 2, 3 is particularly advantageous.

Figure 4:
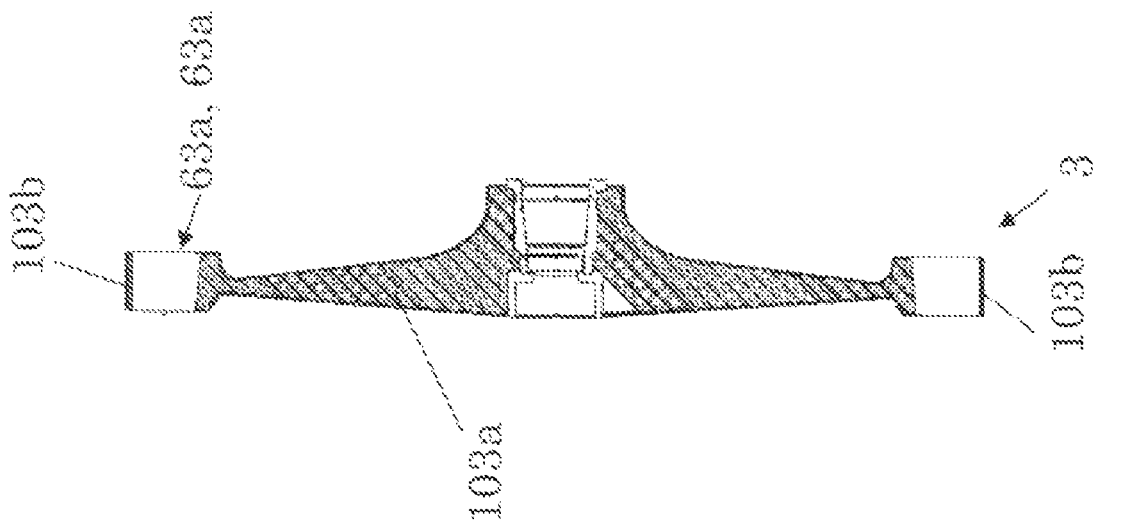
FIG. 4 shows a further elaboration of a part of the system.
Figure 4:
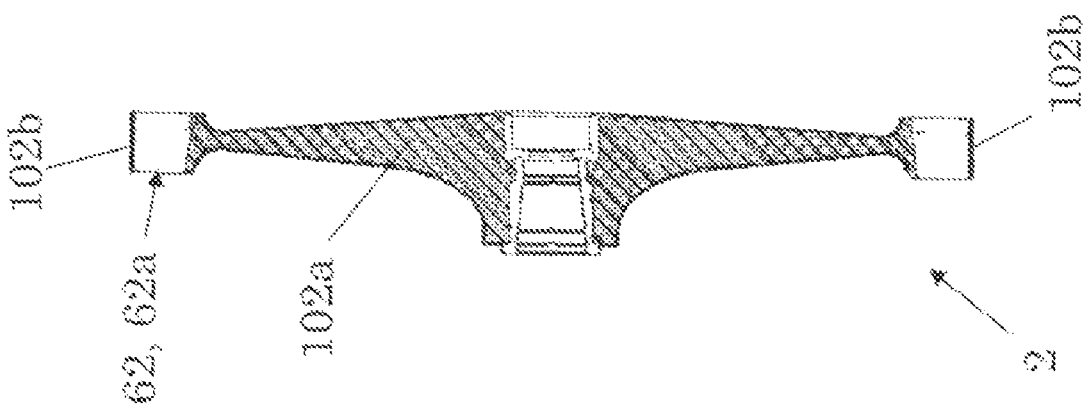

FIG. 4 shows a further elaboration of the blade wheels 2, 3. Preferably, each wheel 2, 3 is manufactured substantially from plastic. Each rotor 2, 3 can comprise, for instance, a plastic main part 102a, 102b, which main part 102a, 102b is provided with the blades and channels. The main part 102a, 102b of each wheel 2, 3 can be manufactured from different materials, for instance from a heatproof plastic, for instance a polyaryletherketone (PAEK, Polyetheretherketone (PEEK), Ertalyte (PET-P), polystyrene sulfonate (PPS), Polyetherimide (PEI), or another plastic. The plastic can for instance comprise a fiber reinforced plastic, for instance with glass fiber reinforcement or carbon fiber reinforcement. In this manner, the wheels 2, 3 can be designed to be lightweight.

The main part 102a, 103b of the wheel 2, 3 can for instance be manufactured from (somewhat) elastic plastic, for instance a plastic mentioned hereinabove. Through the use of a somewhat elastic plastic, a possible slight dynamic imbalance of the rotor 2, 3 can be compensated well.

According to an advantageous embodiment, a blade wheel 2, 3 can for instance be manufactured (substantially) in one piece, for instance by means of a moulding process, and preferably by means of a milling process. In this manner, the wheels can be manufactured at relatively low production costs, and yet with very high precision.

It is further advantageous if the plastic blade wheel 2, 3 is provided with an (annular) reinforcing belt (cover belt) 102b, 103b which is preferably designed to prevent radial expansion of the wheel 2, 3 (under the influence of centrifugal forces). As shown in FIG. 4, this belt 102b, 103b is preferably provided on an outer circumference of the plastic main part 102a, 103b (i.e. the belt encloses the respective main part). The reinforcing belt 102b, 103b may be manufactured from a composite. The reinforcing belt is for instance manufactured from strong fiber material, for instance glass fiber material, which is preferably impregnated, for instance with a thermosetting synthetic resin, for instance a heatproof plastic.

The reinforcing belt 102b, 103b can produce such a high tensile strength/weight ratio that the belt can give a structural contribution to resisting centrifugal forces of the entire blade wheel 2, 3.

Through the use of substantially plastic blade wheels 2, 3 preferably provided with the reinforcing belt mentioned, a very favourable tensile strength/weight ratio can be obtained, so that relatively high loads and high speeds are possible (for instance higher than with metal rotors).

The plastic rotors 2, 3 can be designed to be relatively strong and durable. Furthermore, the blades of the two plastic rotors 2, 3 can revolve very close together, so that losses can be reduced to a minimum.

It is noted that the wheels 2, 3 can also be manufactured from metal or an alloy. However, it appears that as a rule, after manufacture, metal wheels have a spherical cross section so as to be sufficiently strong. As a result, the distance between the blades of the two rotors becomes too great for a desired, highly efficient operation.

Preferably, the system is provided with synchronizing means designed for synchronizing rotation of the blade wheels 2, 3. The system 1 may be couplable to such synchronizing means.

According to a simple elaboration, electric outputs 32, 33 of the current generators 12, 13 are coupled to each other via an electric connection, for the purpose of synchronization of rotational speed of the generators 12, 13 and blade wheels 2, 3 coupled thereto. This is represented in FIG. 3. In the represented circuit, the electric outputs 32 are each provided with a rectifier 38, with outputs of the rectifiers 38 electronically coupled to each other. In this manner, the synchronization can be achieved automatically, with relatively simple and durable means, and the microturbine system can yield a particularly high efficiency. In a further elaboration, the outputs can for instance comprise three-phase current outputs. In that case, the first, second and third phase of one generator 12 are preferably electrically connected to the first, third and second phase, respectively, of the other generator 13 (for the purpose of reversing the rotational direction).

The present system can be designed for instance to deliver a rated power smaller than approximately 50 kW, in particular smaller than approximately 20 kW. A power, delivered during use by the system 1 can for instance be in the range of 1-15 kW.

As shown in FIG. 3, a control device 84 may be provided for controlling the system, for instance such that the blade wheels 2, 3 rotate at a desired, predetermined nominal speed. The system (for instance the control device 84) can further be provided with, for instance, user operating means and/or user communication means (not shown), for instance a user interface or the like, for the purpose of operating the system and/or providing information to a user about an operative condition of the system.

Preferably, the steering device 84 is designed for determining a rotation parameter (for instance rotational speed or a parameter associated therewith, for instance an alternating current frequency) of a blade wheel and/or a generator rotor mentioned. To this end, the control device can be provided with and/or be connected to, for instance, a suitable sensor, which may be disposed inside or outside the casing K1, K2, K3. Such a sensor can for instance comprise an optical, electric, magnetic and/or other sensor, designed for measuring rotation of a blade wheel and/or a generator rotor mentioned. In the present example, the steering device 84 is simply designed for determining the rotation parameter on the basis of an output current, and in particular on the basis of the frequency, of one of the generators: to this end, the device 84 is coupled to one of the electric outputs 32, 33. The control device 84 can measure the frequency of the alternating current, outputted via the output 32 and compare this to, for instance, a desired alternating current to be outputted. Alternatively, the control device 84 can determine the rotational speed of the generator rotor on the basis of the alternating current outputted via output 32, and compare the thus determined rotational speed to a desired (for instance nominal) rotational speed. To this end, information with respect to an alternating current to be outputted and/or desired rotational speed can for instance be stored in a memory of the control device 84, which will be clear to the skilled person. The control device 84 can be designed in various manners, and comprise, for instance, a processor, controller, computer, micro electronics and/or the like and can be provided on the casing of the system 1 or be disposed at a distance from the system. Preferably, the control device 84 is designed for regulating the regulating means 85 for the purpose of regulating the pressure medium supply. The control device 84 is further preferably designed for controlling the heating device 82 (or regulating means 83 thereof).

According to a non-limitative elaboration, a diameter of each blade wheel 2, 3 (in this example measured in the plane YZ) can for instance be smaller than approximately 1 m, in particular smaller than approximately 0.5 m and more particularly smaller than approximately 0.2 m. According to a particularly advantageous embodiment, the blade wheel diameter is approximately 15 cm or less, for instance approximately 13 cm.

A maximum length of the system (measured in an axial direction X) can further for instance be smaller than 1 m, and preferably smaller than 0.5 m. In the present example, this length is for instance the distance measured between side surfaces facing away from each other of the sidewalls 8b, 9b of the second chambers K2, K3.

A height of the system 1 can for instance be approximately equal to a width of the system in particular when the system 1 is designed substantially rotation symmetrically with respect to a longitudinal axis, as is the case in the present example), this is, however, not necessary. In the exemplary embodiment, the height is determined by the outer diameter of the first chamber K1. This outer diameter is somewhat larger than the outer diameter of the blades 2, 3 (for instance approximately 2-10 cm greater, depending on, inter alia, the thickness of the flanges 6a, 6b and a desired distance between the blades and the flanges 6a, 6b). According to one embodiment, a maximum height and width of the system (measured in directions Z and Y, respectively) are for instance each smaller than 1 m, and preferably each smaller than 0.5 m, more preferably smaller than 0.3 m. An especially advantageous embodiment is achieved when the maximum height and width of the system are each approximately 20 cm or less.

In the example, the diameters of the second chambers K2, K3 (measured in YZ planes) are equal to each other. Furthermore, in the example, these diameters are smaller than the diameter of the intermediate first chamber K1. This is advantageous but not necessary, and depends on, for instance, generator configurations.

According to a further elaboration, during use, a rotational speed of a blade wheel 2, 3 can be higher than 4,000 rpm (revolutions per minute), in particular higher than 10,000 rpm, and more particularly higher than 20,000 rpm, which depends on, for instance, the configuration of the blade wheels. It can de established empirically and/or through calculations which rotational speed produces a desired high efficiency with which blade wheel configuration. The rotational speed mentioned can for instance be 28,000 rpm with a blade diameter of 13 cm.

The system shown in the Figures can carry out a method for generating electricity. The method comprises, for instance, generating superatmospheric steam (or another pressure medium) by the heating device 82. For the purpose of generating steam, the heating device 82 can burn fuel (for instance natural gas or another fuel), supplied via a fuel supply 82, for generating steam from water with the released heat. A regulating valve 83 or the like can be provided for regulating fuel supply to the heating device 82.

The generated steam (or other pressure medium) is used for bringing and keeping the first blade wheel 2 in rotation in a first rotational direction. To this end, the superatmospheric steam is supplied via the supply line 88 to the one or more (preferably at least two) Laval nozzles 4, which nozzles 4 spout the steam at supersonic speed in the direction of the channels 62 of the first rotor 2 for driving this wheel 2. As follows from FIG. 2, the rotating first blade wheel 2 can reverse a tangential direction of movement of the steam, and spout into the channels 63 of the second rotor 3 for driving this second wheel 3. In this manner, the second wheel 3 is brought and kept in rotation in a second rotational direction, opposite to the first rotational direction, utilizing pressure medium coming from the first blade wheel 2.

Steam, coming from the channels 63 of the second blade wheel 3 can be discharged from the system 1 via condenser outlet 5. Preferably, in this outlet, a reduced pressure prevails (condenser pressure) which is generated by/in the condenser 81. Steam, used by the system 1, discharged via the outlet 5, can be supplied via the line 89 to the condenser 81 and be condensed by the condenser (downstream relative to the blade wheel). Condensed pressure medium (water, in this example) can be fed by the pump 81p and line 87 back to the pressure medium generator 82, to, once more, generate superatmospheric pressure medium (steam) therefrom.

Furthermore, the first and second electricity generator, respectively, are driven under the influence of the rotating blade wheel 2, 3 directly coupled thereto.

Preferably, blade wheels 2, 3 rotating in opposite directions have the same rotational speed, which can be achieved by means of said synchronization means 32, 33, 38 (at least in that the outputs of the generators are electrically coupled to each other, and are thus forced to turn in phase via electric interaction. The rotational speed of the two blade wheels 2, 3 is then synchronized utilizing the synchronization of rotation of the rotors R of the electricity generators.

Thus generated steam can be supplied to, for instance, one or more current (end) consumers. In addition, the generated alternating current (AC) can for instance be converted by a converter 40 into direct current (DC). It is furthermore advantageous when one or more electricity storage stations 39 are provided, provided with, for instance, one or more accumulators, batteries or the like for storing electricity generated by the system.

Preferably, during use, the first electricity generator generates more than 50%, in particular more than approximately 70% of a total, generated power, while the second electricity generator a remaining part (less than 50%, less than approximately 30%, respectively) of a total power generated by the system 1.

Preferably, the system 1 is controlled such that the system delivers a desired rated power. To this end, the wheels 2, 3 and rotors R are brought and held at a desired predetermined rotational speed. To this end, the control device 84 can for instance determine an above-mentioned rotation parameter (for instance rotational speed or an associated parameter, for instance an alternating current frequency) of a blade wheel and/or a generator rotor, in particular by means of a suitable sensor. On the basis of the determined rotation parameter, the control device 84 can effect a suitable/desired control of pressure medium generation and pressure medium supply (via regulating means 86, 85). In addition, the control device 84 can effect reduction of the supply of pressure medium to the turbine or even complete blocking, if the device 84 detects an undesired and/or unsafe turbine operative condition (for instance an excess of turbine rotational speeds with respect to a nominal rotational speed).

Further, a power produced by the system 1 can for instance be controlled by activating/deactivating one or more nozzles 4, in case the system has at least two nozzles 4. Each nozzle can then for instance be provided with a respective regulating means 85, such that supply of pressure medium to the wheel 2 via the nozzles 4 can be regulated independently per nozzle 4.

The present system can comprise an impulse (action) steam turbine provided with fixedly disposed nozzles 4 and having two speed steps. The system 1 needs no stationary guide blades. Further, use of gear transmissions can be avoided. Through the configuration of the system, energy can be generated particularly efficiently. The system is compact and can deliver relatively low powers locally, in a particularly safe and reliable manner. Furthermore, the system is particularly durable and can be of relatively inexpensive design.

The present system is vibration-low, quiet and can be suitable or designed to utilize various types of fuel or heat sources (in particular for the purpose of generating the pressure medium), for instance residual heat.

To the skilled person, it is self-evident that the invention is not limited to the exemplary embodiments. Various modifications are possible within the framework of the invention as set forth in the following claims.

For instance, the blade wheels mentioned can be designed in various manners.

An advantageous elaboration further comprises synchronization of the wheels 2, 3 (such that during use, a ratio of rotational speeds of the wheels 2, 3 is constant). The wheels can for instance, during use, rotate at the same speed.

It has appeared that in case the system 1 is designed for delivering a relatively low power, for instance lower than 3 kW, synchronizing at an equal speed needs not produce the maximum efficiency. In that case, it appears to be more advantageous to have the speed (rotational speed) of the second wheel 3 be smaller than the speed (rotational speed) of the first wheel 2, preferably with a fixed ratio Q of speeds.

Here, use can for instance be made of generators 12, 13 that deliver mutually different electric voltages at the same speed. The second generator 13 can for instance be designed for generating a second voltage at a particular generator speed, which second voltage is a factor Q higher than a first voltage generated at the same speed by the first generator 12. If the second blade wheel 13 is to rotate for instance a factor two slower than the first wheel 2, this can be achieved by designing the generator 13 such that this delivers a double voltage (Q=2) with respect to a voltage delivered by the first generator 12, at equal speed. The first and second voltage delivered by the two generators 12, 13 can then be coupled (after rectification) for effecting the desired synchronization of the blade wheels 2, 3.

What is claimed is:

1. A microturbine system, comprising:
a first and a second blade wheel;
at least one nozzle for spouting a pressure medium onto the first blade wheel for driving this wheel, wherein the first blade wheel is configured for transferring the pressure medium received from the nozzle onto the second blade wheel for driving the second blade wheel, the arrangement being such that the first and second blade wheels are rotatable in opposite directions under the influence of the pressure medium; and
a first and second electricity generator respectively, coupled to the first and second blade wheel, respectively,
a first chamber sealed off gas-tightly from a surrounding, in which said blade wheels are disposed, and
a second chambers, sealed off gas-tightly from the surrounding, in which rotor parts of said electricity generators are disposed.

2. A system according to claim 1, further comprising one or more synchronization components designed for synchronizing rotation of the wheel blades.

3. A system according to claim 1, wherein each electricity generator comprises a respective rotor which is non-rotatably coupled to a drive shaft, which drive shaft is non-rotatably coupled to a respective blade wheel.

4. A system according to claim 1, wherein the pressure medium is steam.

5. A system according to claim 1, wherein during use, the pressure in each of the chambers is subatmospheric.

6. A system according to claim 1, further comprising one or more spaces sealed off gas-tightly from a surrounding, in which the blade wheels and rotor parts are disposed, the system being designed for holding said one or more spaces at a reduced pressure with respect to an ambient pressure.

7. A system according to claim 1, further comprising an outlet for discharging pressure medium from the first chamber, wherein the system comprises a device designed for holding said outlet during use at a subatmospheric pressure.

8. A system according to claim 1, further comprising one or more component for transferring, during use, a pressure prevailing in the first chamber to each of the second chambers.

9. A system according to claim 1, wherein the system is designed for delivering a rated power smaller than approximately 50 kW.

10. A system according to claim 9, wherein the rated power is smaller than approximately 20 kW.

11. A system according to claim 1, wherein a diameter of each said blade wheel is smaller than approximately 1 m.

12. A system according to claim 11, wherein the diameter of each said blade wheel is smaller than approximately 0.5 m.

13. A system according to claim 11, wherein the diameter of each said blade wheel is smaller than approximately 0.2 m.

14. A system according to claim 1, wherein during operation, a rotational speed of said first and second blade wheels is higher than 4,000 rpm (revolutions per minute).

15. A system according to claim 14, wherein during operation, the rotational speed of said first and second blade wheels is higher than 10,000 rpm.

16. A system according to claim 14, wherein during operation, the rotational speed of said first and second blade wheels is higher than 20,000 rpm.

17. A system according to claim 1, wherein rotational speed of the blade wheels is synchronized utilizing a synchronization of rotation of rotors of the electricity generators.

18. A system according to claim 7, wherein the subatmospheric pressure is approximately 0.1 bar or less.

19. A method for generating electricity, utilizing a system according to claim 1, comprising
generating a pressure medium;
rotating a first blade wheel in a first rotational direction utilizing the pressure medium;
rotating a second blade wheel in a second rotational direction opposite to the first rotational direction utilizing the pressure medium coming from the first blade wheel;
driving, under the influence of the first and second rotating blade wheel, a first and second electricity generator, respectively, characterized in that the blade wheels and rotors of the generators are disposed in one or more spaces sealed off gas-tightly from a surrounding, which spaces are held at a reduced pressure with respect to an ambient pressure.

20. A method according to claim 19, wherein the blade wheels rotating in opposite directions have the same rotational speed.

21. A method according to claim 19, wherein the pressure medium leaves one or more nozzles at supersonic speed for driving the first blade wheel, wherein the rotating first blade wheel reverses a tangential direction of movement of the pressure medium for driving the second blade wheel.

22. A method according to claim 19, wherein at least two nozzles are utilized, and wherein a power delivered by the system is controlled by activating/deactivating one or more nozzles.

23. A method according to claim 19, wherein rotational speed of the blade wheels is synchronized utilizing a synchronization of rotation of rotors of the electricity generators.

* * * * *